United States Patent [19]
Bichel

[11] 3,938,683
[45] Feb. 17, 1976

[54] COMBINE GRAIN TANK LOADING CONVEYOR

[75] Inventor: Darwin Carl Bichel, East Moline, Ill.

[73] Assignee: Deere & Company, Moline, Ill.

[22] Filed: Nov. 13, 1974

[21] Appl. No.: 523,508

[52] U.S. Cl............................. 214/519; 214/83.32
[51] Int. Cl.² ............................................ B60P 1/40
[58] Field of Search ........ 214/519, 83.32, 521, 522; 198/104, 213

[56] References Cited
UNITED STATES PATENTS

| | | | |
|---|---|---|---|
| 1,525,506 | 2/1925 | Lauterbur | 198/104 X |
| 2,783,906 | 5/1957 | Helms | 214/519 |
| 3,503,533 | 3/1970 | Bichel | 214/519 |
| 3,664,525 | 5/1972 | Herbsthofer | 214/83.32 X |

*Primary Examiner*—Albert J. Makay

[57] ABSTRACT

A self-propelled combine has an elevated grain tank and a clean grain elevator extending upwardly along one side of the combine body and having an upper discharge end below the level of the top of the grain tank. The upper discharge end of the elevator dumps into a chamber that is disposed adjacent to one side of the grain tank, and a laterally extending auger type conveyor is inclined upwardly and inwardly in cantilever fashion from the chamber for moving grain from the chamber to the discharge end of the auger type conveyor, which is above a central portion of the grain tank. The lower end of the conveyor auger extends through the outer wall of the chamber and a bevel type gear case is mounted on the wall of the chamber, the gear case having an upwardly and inwardly inclined output shaft connected to the auger and a horizontal input shaft that is driven by belt drive on the side of the combine.

4 Claims, 2 Drawing Figures

COMBINE GRAIN TANK LOADING CONVEYOR

BACKGROUND OF THE INVENTION

This invention relates to an improved combine grain tank loading system and more particularly to an improved drive for driving an auger type conveyor that moves the grain from one side of the combine to a discharge point above a central portion of the grain tank.

Still more specifically, this invention relates to an improved drive for a combine grain tank loading system of the general type shown in U.S. Pat. No. 3,503,533, also assigned to the assignee herein.

As pointed out in said patent, current combines conventionally include an elevated grain tank in which the harvested crop is temporarily stored during the harvesting operation, and the grain tanks are conventionally loaded by a clean grain elevator which collects the clean grain from a grain cleaning mechanism near the bottom of the machine and elevates it along one side of the combine body. As is apparent from said patent, it is known to provide an elevator having its upper discharge end below the level of the top of the grain tank adjacent one side of the grain tank, and it is further known to provide a laterally extending auger type conveyor that extends upwardly and inwardly from the upper discharge end of the elevator in cantilever fashion for moving and discharging the grain above a central portion of the grain tank. As is also apparent from said patent, the auger type conveyor includes a horizontal outer section and an upwardly and inwardly inclined portion within the grain tank, the auger type conveyor being driven by a belt drive disposed at the outer end of the conveyor. A universal joint is provided in the auger shaft at the juncture of the outer and inner sections to accommodate the inclination of the inner section relative to the horizontal outer section.

SUMMARY OF THE INVENTION

According to the present invention, there is provided an improved grain tank loading system of the general type shown in U.S. Pat. No. 3,505,533. More specifically, improved drive means are provided for driving the inclined laterally extending auger type conveyor.

An important feature of the invention resides in the provision of only a single straight section of auger in the auger type conveyor, eliminating the necessity for universal joints and the like in the auger drive line. Another important feature of this invention resides in the provision of a gear case at the outer end of the auger type conveyor, the gear case having a horizontal input shaft and an inclined output shaft connected to the auger with bevel gearing being provided in the gear case to drivingly interconnect the two shafts.

DESCRIPTION OF THE PREFERRED EMBODIMENT

Figure 1:
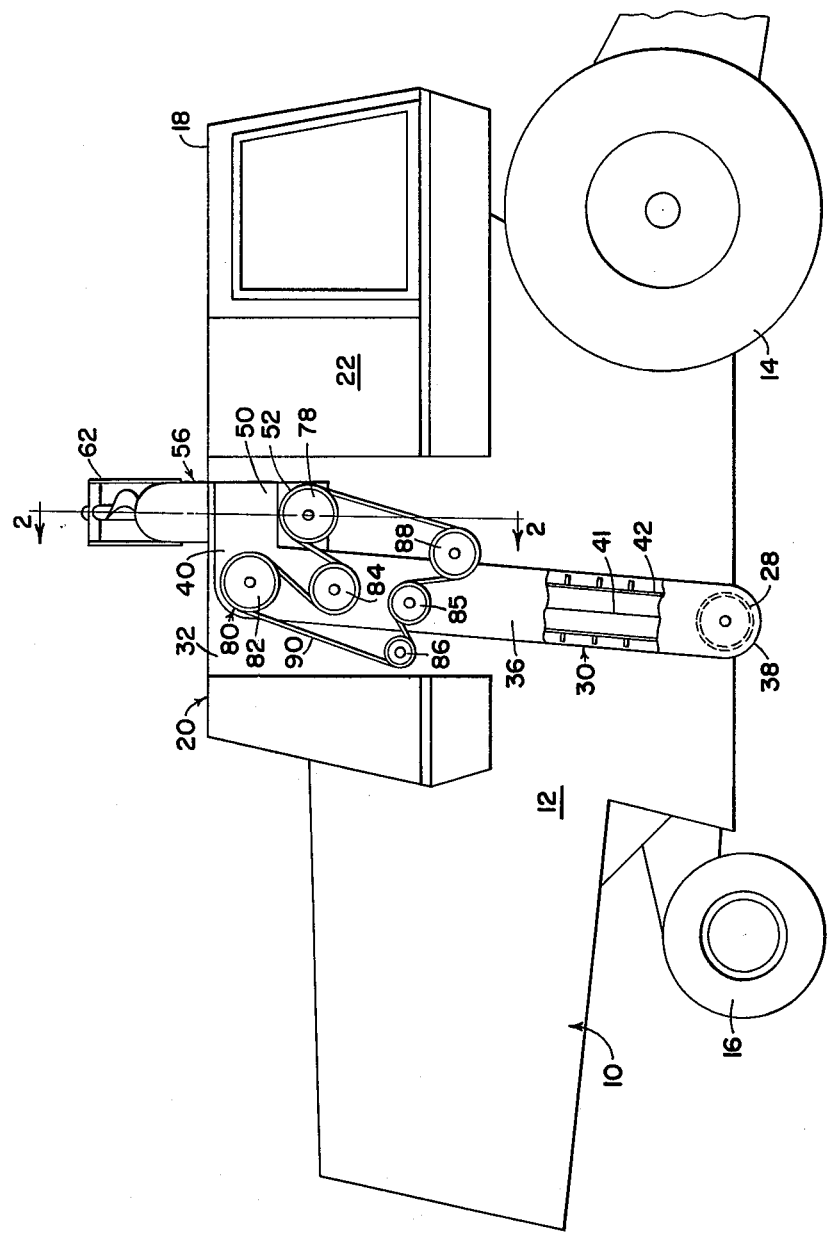
FIG. 1 is a schematic side elevation view of a combine embodying the present invention, with portions of the paneling of the combine being broken away to show the drive for the improved grain tank loading system.
Figure 2:
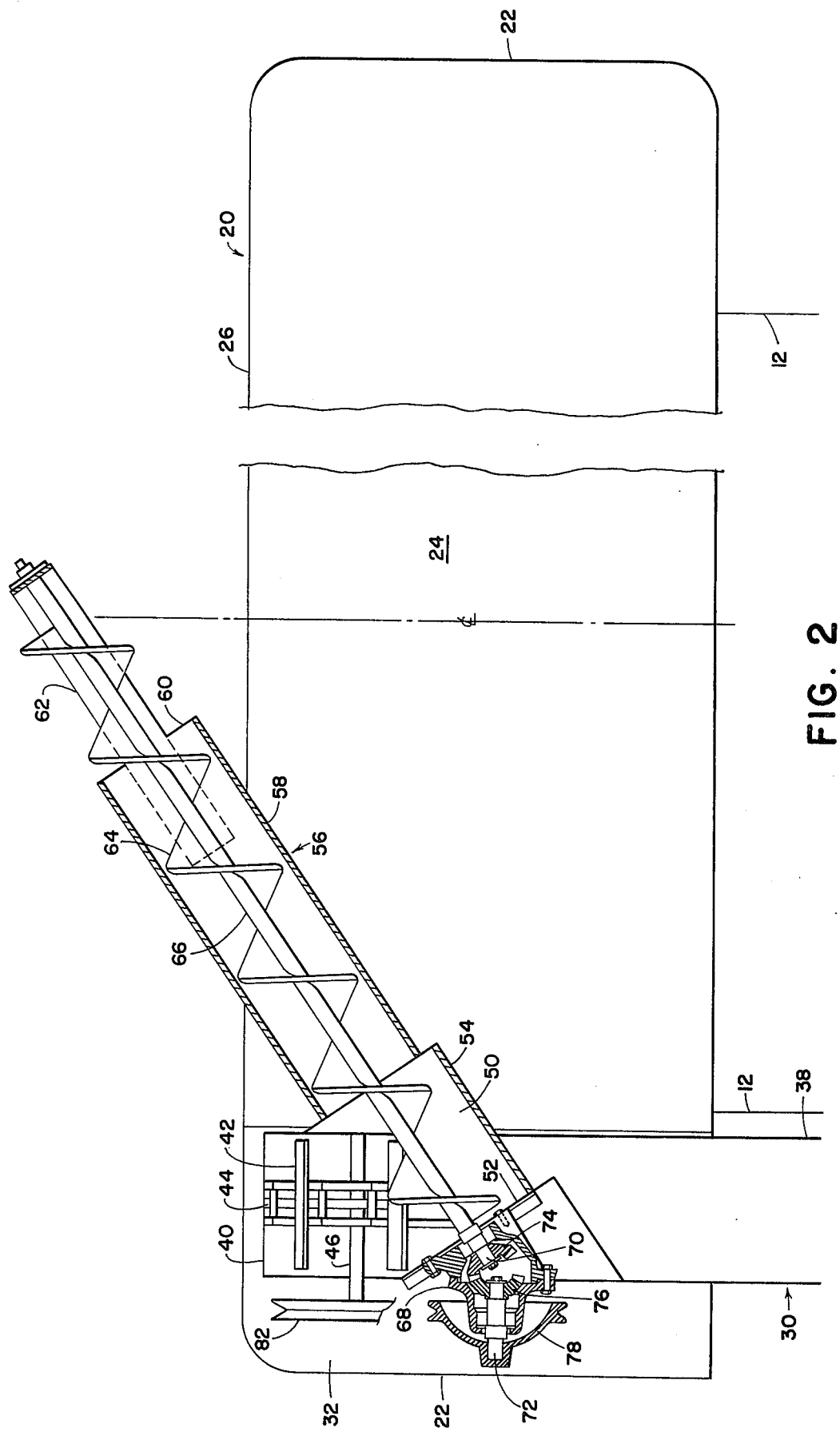
FIG. 2 is an enlarged, partly schematic, upright transverse section through the grain tank as viewed generally along the line 2—2 of FIG. 1.

The invention is embodied in a self-propelled combine that includes an elongated fore and aft main separator body 10 having opposite upright side walls 12 and mounted on a pair of forward drive wheels 14 and steerable rear wheels 16, the above representing conventional combine construction. An elevated engine compartment 18 is disposed at the forward end of the combine and immediately to the rear of the engine compartment is an elevated grain tank, indicated generally by the numeral 20. As is well known, the grain tank is substantially wider than the combine body 10 and has outer side walls 22 disposed outwardly of the body side walls 12. The rear wall of the engine compartment 18 forms the front wall of the grain tank, which also includes an upright rear wall 24 and an open top 26. Extensions can be added that extend upwardly from the periphery of the open top to increase the height of the grain tank and therefore the grain tank capacity.

As is well known, a separating mechanism in the body 10 separates the grain from the remainder of the crop material and moves the grain to a cleaning mechanism, which is also disposed in the body, the clean grain falling to a transverse clean grain collecting auger 28 at the bottom of the body. The auger moves the grain laterally through the combine right side wall to a clean grain elevator, indicated generally by the numeral 30.

The elevator is vertically elongated, and extends upwardly from the auger 28 along the combine right side wall and through a vertical recess 32 in the right side of the grain tank. The recess 32 extends upwardly all the way to the top of the grain tank and is normally covered by a removable panel that is flush with the right side wall of the grain tank. The elevator includes an elongated housing 36 having a lower intake end 38 communicating with the outer discharge end of the auger 28, and an upper discharge end 40, the top of which is at approximately the same level as the top of the grain tank. The elevator is divided into front and rear sections by an upright transverse divider 41, and a chain and slat type conveyor 42 is mounted in the housing in the well known fashion, the conveyor 42 moving upwardly in the rearward half of the housing to move the grain from the auger 28 to the upper discharge end 40 and returning downwardly in the forward portion of the housing 36. The conveyor 42 is trained around an upper sprocket 44 at the discharge end 40, and the sprocket 44 is mounted on a transverse shaft 46 extending laterally through the elevator housing 36.

The discharge end 40 of the elevator housing 36 is open toward the front of the combine and the opening communicates with a chamber 50 disposed immediately in front of the upper end of the elevator housing. The chamber 50 includes an inclined end wall 52 and an outer wall 54 that extends downwardly from the opening in the elevator housing and thence forwardly.

An auger type conveyor, indicated generally by the numeral 56, is inclined inwardly and upwardly from the chamber 50 in cantilever fashion and terminates above a central portion of the grain tank above the level of the grain tank top 26. The auger type conveyor 56 includes a tubular housing 58 that communicates with and extends upwardly and inwardly from the chamber 50 and has an open upper end 60. A U-shaped bracket 62 has its opposite ends attached to the opposite sides of the upper end of the housing 58, the central fore and aft portion of the bracket 62 being opposite from and spaced from the open housing end 60. An auger 64 is coaxially mounted in the tubular housing 58 and includes an axial shaft 66, the upper end of which is journaled in the central portion of the bracket 62, so that the auger 64 extends a short distance out the open end 60 of the housing. The auger 64 also extends through the lower end of the housing 58 into the chamber 50, the lower end of the auger shaft 66 extending through and being journaled in the chamber end wall 52.

A gear case 68 is mounted on the exterior side of the chamber end wall 52, and the gear case includes an upwardly and inwardly inclined output shaft 70 coaxially, connected to the auger shaft 66, and a transverse horizontal input shaft 72. A pair of meshing bevel gears 74 and 76 are respectively disposed within the gear case and are respectively mounted on the output shaft 70 and the input shaft 72 to drivingly connect the input shaft to the output shaft. A V-belt sheave 78 is mounted on the input shaft 72 on the exterior side of the gear case 68.

The sheave 78 is driven by a belt drive, indicated generally by the numeral 80 and illustrated in FIG. 1 The drive includes a sheave 82 mounted on the outer end of the shaft 46, a pair of idlers 84 and 85 mounted on the side of the elevator housing 36, a belt tensioning sheave 86 that is spring loaded to provide the proper belt tension in the drive 80, and a drive sheave 88, a belt 90 being trained around the above sheaves to drive the sheaves 78 and 82. The drive sheave 88 is driven by other belt drives (not shown) on the side of the combine in the conventional manner.

In operation, the clean grain collecting auger 28 moves the clean grain to the side of the combine to the intake end of the elevator 30 which raises the grain to the upper discharge end 40, where it discharges the grain forwardly into the chamber 50, where the grain is engaged by the auger 64 and moved upwardly and inwardly along the housing 58. As is apparent, the grain is discharged out the open end 60 of the housing above the central portion of the grain tank, the inclined auger type conveyor providing a fountain type discharge which provides a relatively even distribution of grain throughout the grain tank. As is also apparent, the bevel type gear case 68 accommodates the angled auger type conveyor without the necessity of univeral joints or the like in the auger shaft. The gear case type drive permits the use of a single section auger in the auger conveyor, and provides a durable and simple drive without the problems that normally accompany universal type drives when the drives operate through a substantial angle.

I claim:

1. In a combine having a main separator body with opposite upright side walls, an elevated grain tank, and a clean grain elevator extending upwardly along one of the body side walls for elevating clean grain and having an upper discharge end adjacent the top of the grain tank the combination therewith of an improved grain tank loading conveyor for moving grain from the discharge end of the elevator to the grain tank and comprising: A laterally extending upwardly and inwardly inclined, straight, generally tubular auger housing having a lower intake end communicating with the upper discharge end of the elevator adjacent one side of the grain tank, an upper discharge end above a central portion of the grain tank and a lower end wall normal to the axis of the housing; an auger rotatably mounted in the housing and including an axial shaft; and a gear case mounted on the lower end wall of the housing and including a horizontal input shaft, an inclined output shaft coaxially connected to the auger shaft, and bevel gear means drivingly connecting the input shaft to the output shaft; and drive means operatively connected to the input shaft, for rotating the input shaft.

2. The invention defined in claim 1 wherein the housing extends upwardly and inwardly from the elevator in cantilever fashion, the upper discharge end of the auger being disposed generally on the fore and aft center line of the grain tank.

3. The invention defined in claim 1 wherein the housing includes a chamber at its lower intake end and adapted to receive grain from the elevator, the auger extending through the chamber and moving the grain upwardly and inwardly therefrom.

4. The invention defined in claim 1 wherein the elevator includes an upper drive sprocket and the drive means includes a drive sheave adjacent the side of the combine, a first driven sheave coaxially connected to the upper drive sprocket, a second driven sheave mounted on the gear case input shaft, and a belt drivingly trained around the drive and driven sheaves.

* * * * *